United States Patent [19]

Fudala

[11] Patent Number: 5,493,580
[45] Date of Patent: Feb. 20, 1996

[54] PROCESS FOR RECYCLING THE FILTER DUST IN AN ELECTRIC ARC FURNACE FOR PRODUCING STEEL

[75] Inventor: Brigitte Fudala, Hasnon, France

[73] Assignee: Intracon S.A.R.L., France

[21] Appl. No.: 318,708

[22] PCT Filed: Feb. 9, 1994

[86] PCT No.: PCT/FR94/00147

§ 371 Date: Oct. 7, 1994

§ 102(e) Date: Oct. 7, 1994

[87] PCT Pub. No.: WO94/18348

PCT Pub. Date: Aug. 18, 1994

[30] Foreign Application Priority Data

Feb. 9, 1993 [DE] Germany .......................... 43 03 751.8

[51] Int. Cl.$^6$ ....................................................... F27D 3/00
[52] U.S. Cl. ................... 75/10.61; 373/9; 373/80; 373/79; 75/10.66; 75/961
[58] Field of Search .................. 373/9, 2, 79, 80–82; 266/9, 11, 36 R; 75/77, 10.66, 386

[56] References Cited

U.S. PATENT DOCUMENTS

| | | | |
|---|---|---|---|
| 3,599,947 | 8/1971 | Sherwood | 266/9 |
| 4,147,887 | 4/1979 | Yasukawa et al. | 373/81 |
| 4,514,223 | 4/1985 | Kawakita et al. | 75/77 |
| 5,078,785 | 1/1992 | Ibaraki et al. | 75/386 |
| 5,218,617 | 6/1993 | Herrera-Garcia et al. | 373/33 |

FOREIGN PATENT DOCUMENTS

| | | |
|---|---|---|
| 0579791 | 1/1994 | European Pat. Off. . |
| 2634787 | 2/1980 | France . |
| 3708730 | 9/1988 | Germany . |
| 57-120634 | 7/1982 | Japan . |
| 4099231 | 3/1992 | Japan . |

OTHER PUBLICATIONS

"Metallugische Verwertung Von Stauben und Schlammen der Stahlindustire," J. Geiseler et al, Stahl und Eisen, No. 7 Apr, 10, 1989, pp. 359–365.

*Primary Examiner*—Tu Hoang
*Attorney, Agent, or Firm*—Ladas & Parry

[57] ABSTRACT

The present invention relates to a process of recycling filter dust obtained during the production of steel in an electric arc furnace. Filter dust is injected and mixed with the smalls of carbon containing material in the slag or at the interface between the slag and the molten metal bath in the melting tank. The process of the invention also improves the degree of efficiency of the foaming of the slag while increasing the profitability of steel production.

14 Claims, No Drawings

PROCESS FOR RECYCLING THE FILTER DUST IN AN ELECTRIC ARC FURNACE FOR PRODUCING STEEL

BACKGROUND OF THE INVENTION

The present invention relates to a process for recycling the filter dust obtained during the production of steel in an electric arc furnace.

A known process for producing steel is the process which is carried out in an electric arc furnace.. In an electric arc furnace, the steel is principally molten from scrap iron or sponge iron.

During the implementation of this steel production process, considerable quantities of dust are produced. This dust is collected in dust-filtering devices. Depending on the conditions of operation of the process and on the raw materials used, between 3 and 30 kg of filter dust are produced per ton of steel. The filter dust obtained is essentially composed of metal oxides: iron, zinc, calcium, aluminium, lead, bismuth, mercury, cadmium, tin and silicium. Given that the filter dust contains valuable metals, in particular zinc, lead and cadmium in oxide form, efforts are made to treat the filter dust, for example by a mixing process using a rotary furnace, in order to particularly enrich the zinc, lead and cadmium metals. However, a large quantity of energy is needed, which is economically justified only if, for example, the proportion of zinc oxides in the filter dust exceeds 25%. If such proportions are not contained in the filter dust, said dust should, in view of the toxic heavy metals that it contains, be put into classified dump ground, which entails considerable extra costs.

It is known from the article published in "Fachberite Hüttenpraxis Metallweiterverarbeitung" Vol. 25, No. 1, 1987, pages 16, 18, to inject small coal into the molten metal bath of an electric arc furnace, using a lance sunk into said molten metal bath in order to obtain a foaming of the slag.

The revue "Stahl und Eisen" 109 (1989), No. 7, pages 359–365 describes the pneumatic recycling of filter dust in electric arc furnaces by injection of said dust in the molten metal bath. The object of this is to enrich the newly produced dust in zinc and in lead. However, the obtained samples of steel partially show high zinc contents, which are undesirable. Moreover, it is pointed out that the injection of filter dust requires more energy for melting and reduction of said dust during the production of steel in the electric arc furnace.

Patent Application DE-A-3 708 730 describes a process for re-using the filter dust obtained during the production of steel in a converter, which is not an electric arc furnace. According to this process, the filter dust is injected in the melting tank with carbon carriers, for example small coal, vehiculated by a carrier gas, such as carbon monoxide or methane. It is expressly indicated that it is important to inject the filter dust in the molten metal bath, i.e. through nozzles situated below the surface of the bath.

SUMMARY OF THE INVENTION

It is the object of the present invention to provide a simple and economical process for recycling the filter dust obtained during the production of steel in an electric arc furnace and at the same time to imptove the foaming of the slag.

This object is perfectly reached by the process of the invention. It is a process for recycling the filter dust obtained during the production of steel which, in a manner known from document DE-A-3 708 730, consists in injecting a mixture of filter dust and of smalls of a carbon-containing material in a melting tank.

Characteristically, according to the invention where the melting tank is that of an electric arc furnace, said mixture is injected in the slag or at the interface between the slag and the molten metal bath, thus improving the foaming of the slag.

The injection is performed for example by means of a lance or even of a nozzle with a carder gas.

As carbon-containing material, it is possible to use materials which are normally used with metallurgical processes, such as coal, coke, coke dust, acetylene coke, lignite, anthracite, graphite, petrol coke and mixtures based on the aforesaid carbon-containing materials.

Normally, smalls designate materials which have a granulometry ranging between 0 and 5 mm.

The process according to the invention provides several unexpected but advantageous effects. It is surprising that when filter dust is injected, it is not necessary to increase the quantity of carbon-containing material which is normally used to initiate and keep up the foaming of the slag; said quantity is for example, in the conventional electric arc furnaces, between 2 and 20 kg per ton of steel. The Applicant has discovered that the introduction of filter dust, in addition to the smalls of carbon-containing material, increases the degree of efficiency of the foaming of the slag. This result is thought to be due to the fact that the oxides contained in the filter dust serve as an added source for the formation of carbon monoxides/carbon dioxides, which increases the foaming capacity of the slag.

Theoretically, it could be admitted that the recycling of 2 kg of dust per ton of steel produced, requires, in order for the smalls of carbon-containing material to reduce the metal oxides contained in the filter dust, an extra consumption of energy, due to the simultaneous introduction in the slag of products containing carbon and iron oxide. The reduction reaction in the slag increases the degree of efficiency of the foaming of the slag. Consequently, in an electric are furnace, the absorption of the indirect radiation of the arcs is improved, and the damaging effect of the indirect radiation of the are on the lining of the furnace is reduced. Also, according to the invention, there is no increase of the acidity of the slag, on the contrary, an essential increase of iron can be noted, which is due to the filter dust, this improving the steel production. Finally, it is possible by repeated recycling of the filter dust, to increase the zinc content in said dust to about 25 to 30%, thereby affording an economical saving on the subsequent treatment, and this without any undesirable high zinc contents in the produced steel.

The mixture of the filter dust with smalls of carbon-containing material, before the injection in the furnace can, in practice, be readily achieved by introducing and mixing the filter dust and the smalls of carbon-containing material separately in a tank or in a mixing hopper, and by introducing the resulting mixture in a hopper wherefrom the mixed material is extracted in order to be injected in the furnace.

According to another variant, the filter dust and the smalls of carbon-containing material can also be collected together just before or during the introduction into the furnace, and the two constituents then injected in the melting tank. The injection is performed preferably with a lance or a nozzle.

The introduction of the filter dust and of the smalls of carbon-containing material is done in the slag or at the interface between the slag and the molten metal bath.

Depending on the quantities of carbon injected in the furnace, and on the preparation phases and working conditions, it is possible to inject a mixture containing up to about 70% in volume of dust, which, considering the relative densities of the constituents of the mixture, can represent up to about 80% by weight of dust.

Supposing that between 2 and 30 kg of mixture of filter dust and of smalls of carbon-containing material are injected in a pre-combustion electric arc furnace, for every ton of liquid steel.

Given the fact that when there is no recycling of the filter dust, important extra costs have to be incurred for eliminating it, the process according to the invention procures a substantial saving, hence a reduction of the production costs. Them is no increase in the quantity of carbon-containing material consumed, due to an improved efficiency of the foaming of the slag.

Better results have been obtained by using in the mixture smalls of carbon-containing material of particularly fine granulometry, ranging between 0 and 1 mm.

It has also been found that the fact of using smalls of carbon-containing material of substantially the same granulometry as that of the filter dust, has greatly contributed to improving the qualities of the mixture to be injected, said mixture being then more intimate and more homogeneous; which avoids the problems of clogging-up in the injection means used.

I claim:

1. A process for recycling filter dust obtained during the production of steel comprising the steps of obtaining the filter dust from a furnace; mixing said filter dust with carbon containing material to form a mixture, injecting said mixture of filter dust and carbon containing material in a melting tank wherein the melting tank is that of an electric arc furnace and said mixture is injected in the slag during the slag foaming operation, thereby improving said foaming.

2. The process of claim 1, wherein the filter dust and the carbon-containing material are mixed just before being injected in the melting tank.

3. The process as claimed in claim 1, wherein the mixture comprises a proportion in volume of filter dust of about 70% at the most.

4. The process as claimed in claim 3, wherein the quantity of filter dust contained in the injected mixture is at the most 24 kg for every ton of liquid steel produced.

5. The process of claim 1 wherein the mixture, carbon-containing material have substantially the same granulometry as the filter dust.

6. The process of claim 1 wherein the carbon-containing material has a granulometry ranging between 0 and 5 mm.

7. The process of claim 1 wherein the carbon-containing material has a granulometry ranging between 0 and 1 mm.

8. A process for recycling filter dust obtained during the production of steel comprising the steps of obtaining filter dust from a furnace; mixing said filter dust with carbon containing material to form a mixture, injecting said mixture of filter dust and carbon containing material in a melting tank wherein the melting tank is that of an electric arc furnace and said mixture is injected at the interface between the slag and the molten metal bath during the slag foaming operation, thereby improving said foaming.

9. The process of claim 8, wherein the filter dust and the carbon-containing material are mixed just before being injected in the melting tank.

10. The process as claimed in claim 8, wherein the mixture comprises a proportion in volume of filter dust of about 70% at the most.

11. The process as claimed in claim 10, wherein the quantity of filter dust contained in the injected mixture is at the most 24 kg for every ton of liquid steel produced.

12. The process of claim 8 wherein the mixture, carbon-containing material have substantially the same granulometry as the filter dust.

13. The process of claim 8 wherein the carbon-containing material has a granulometry ranging between 0 and 5 mm.

14. The process of claim 8 wherein the carbon-containing material has a granulometry ranging between 0 and 1 mm.

* * * * *